United States Patent
Kim

(10) Patent No.: US 11,124,244 B2
(45) Date of Patent: Sep. 21, 2021

(54) FRONT BODY FOR VEHICLE

(71) Applicants: HYUNDAI MOTOR COMPANY, Seoul (KR); KIA MOTORS CORPORATION, Seoul (KR)

(72) Inventor: Do Hoi Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 97 days.

(21) Appl. No.: 16/738,107

(22) Filed: Jan. 9, 2020

(65) Prior Publication Data

US 2021/0024140 A1 Jan. 28, 2021

(30) Foreign Application Priority Data

Jul. 25, 2019 (KR) .................. 10-2019-0089980

(51) Int. Cl.
| | |
|---|---|
| B62D 25/20 | (2006.01) |
| B62D 21/08 | (2006.01) |
| B62D 21/03 | (2006.01) |
| B62D 21/15 | (2006.01) |
| B62D 25/14 | (2006.01) |
| B62D 25/08 | (2006.01) |
| B62D 25/02 | (2006.01) |

(52) U.S. Cl.
CPC ......... *B62D 25/2018* (2013.01); *B62D 21/03* (2013.01); *B62D 21/08* (2013.01); *B62D 21/155* (2013.01); *B62D 21/157* (2013.01); *B62D 25/02* (2013.01); *B62D 25/082* (2013.01); *B62D 25/145* (2013.01)

(58) Field of Classification Search
CPC .... B62D 25/2018; B62D 21/08; B62D 21/03; B62D 21/157; B62D 21/155; B62D 25/145; B62D 25/082; B62D 25/02; B62D 21/152; B62D 25/08
USPC .................................................. 296/193.07
See application file for complete search history.

(56) References Cited

U.S. PATENT DOCUMENTS 5,806,918 A * 9/1998 Kanazawa ............. B62D 21/07
296/204
8,585,133 B2 * 11/2013 Yasuhara ........... B62D 25/2018
296/204

(Continued)

FOREIGN PATENT DOCUMENTS

JP H07-156828 A 6/1995
JP 2003-246277 A 9/2003

(Continued)

*Primary Examiner* — Pinel E Romain

(57) ABSTRACT

A front body for a vehicle includes: a front dash cross member having first and second ends respectively connected to front side members positioned at both sides of the vehicle; a left front center support member and a right front center support member being a pair of members disposed ahead of the front dash cross member and located under an engine room of the vehicle; and a center member having a front end connected to a center portion of the front dash cross member and extending rearward along a center line of a floor of the vehicle. In particular, the left and right front center support members each have a rear end connected to the center portion of the front dash cross member, extend forward away from each other, and each have a front end connected to the front side members, respectively.

11 Claims, 4 Drawing Sheets

(56) References Cited

U.S. PATENT DOCUMENTS

| | | | | |
|---|---|---|---|---|
| 8,820,823 | B1* | 9/2014 | Shafer | B62D 25/2036 |
| | | | | 296/204 |
| 9,809,255 | B1* | 11/2017 | Chuang | B62D 21/11 |
| 9,988,100 | B2* | 6/2018 | Kim | B62D 25/082 |
| 10,661,832 | B2* | 5/2020 | Maier | B62D 29/008 |
| 2011/0272972 | A1 | 11/2011 | Takayanagi | |
| 2014/0338996 | A1* | 11/2014 | Baccouche | B62D 21/152 |
| | | | | 180/68.5 |
| 2016/0264177 | A1* | 9/2016 | Kawaguchi | B62D 25/20 |
| 2017/0057547 | A1* | 3/2017 | Taguchi | B62D 21/11 |
| 2018/0065461 | A1* | 3/2018 | Maier | B62D 65/14 |
| 2020/0001929 | A1* | 1/2020 | Ohba | B62D 21/15 |
| 2020/0269930 | A1* | 8/2020 | Kiyoshita | B62D 25/087 |

FOREIGN PATENT DOCUMENTS

| | | |
|---|---|---|
| JP | 2013-216183 A | 10/2013 |
| JP | 2016-064730 A | 4/2016 |
| KR | 10-2017-0000910 A | 1/2017 |
| WO | 2012-086297 A1 | 6/2012 |

\* cited by examiner

FRONT BODY FOR VEHICLE

CROSS REFERENCE TO RELATED APPLICATION

This application claims priority to and the benefit of Korean Patent Application No. 10-2019-0089980, filed on Jul. 25, 2019, the entire contents of which are incorporated herein by reference.

FIELD

The present disclosure relates to a front body for a vehicle that can efficiently enhance crashworthiness and body stiffness of vehicles.

BACKGROUND

The statements in this section merely provide background information related to the present disclosure and may not constitute prior art.

Since an electric vehicle has no engine, the space of an engine room can be very small, and recently, the front overhang is increasingly shortened and the engine room is increasingly narrowed in accordance with design concepts such as an autonomous vehicle.

We have discovered that, according to such designs, a front collision absorption space is very insufficient, so it is difficult to secure crashworthiness required for a front collision and protect passengers.

In other words, it is difficult to provide sufficient crashworthiness and protection with the existing bodies having the reduced the engine room.

The description provided above as a related art of the present disclosure is just for helping understanding the background of the present disclosure and should not be construed as being included in the related art known by those skilled in the art.

SUMMARY

The present disclosure provides a front body for a vehicle that can efficiently enhance crashworthiness and body stiffness of vehicles having a small engine room and a small front overhang such as a small-sized electric vehicle.

In one form of the present disclosure, a front body for a vehicle includes: a front dash cross member having first and second ends respectively connected to front side members positioned at both sides of the vehicle, where the front dash cross member extends in a transverse direction of the vehicle; a left front center support member and a right front center support member being a pair of front center support members disposed ahead of the front dash cross member and located under an engine room of the vehicle, where the left and right front center support members each have a rear end connected to a center portion of the front dash cross member, extend forward away from each other, and each have a front end connected to the front side members positioned at both sides, respectively; and a center member having a front end connected to the center portion of the front dash cross member, and extending rearward along a center line of a floor of the vehicle.

The front side members each have a first connection portion and a second connection portion positioned forward further than the first connection portion.

An end of the front dash cross member may be connected to a first side of the first connection portion, a first connection member may be connected to a second side of the first connection portion, and the first connection member may extend outward from the second side of the first connection portion and may be connected to a door chamber member.

At least one of the left and right front center support members has a front end connected to a first side of a corresponding second connection portion among the second connection portions of the front side members, a second connection member may be connected to a second side of the corresponding second connection portion, and the second connection member may extend outward from the second side of the corresponding second connection portion and may be connected to a fender apron member.

The second connection member may extend along a front end of a front wheel housing.

The rear ends of the left front center support member and the right front center support member may be directly connected to the front end of the center member and the front end of the center member may be connected to the center portion of the front dash cross member.

The front dash cross member, the left and right front center support members, and the center member may have a closed cross-section and may be directly or indirectly connected to each other, thereby forming a load path for a front collision and a side collision.

The front dash cross member may include an inner panel positioned inside and an outer panel positioned outside, and a closed cross-section may be formed by combining the inner panel and the outer panel.

The inner panel of the front dash cross member may cover an upper end of the center member.

The outer panel of the front dash cross member may include a left panel and a right panel, the left panel and the right panel each have an end portion, and the end portions of the left and right panels face to each other and may be respectively coupled to the center member.

The left front center support member and the right front center support member may be formed such that the front ends of the left and right front center support members extend diagonally away from each other from the rear ends, thereby crossing a lower portion of the engine room.

According to the front body for a vehicle of the present disclosure, it is possible to efficiently enhance crashworthiness and body stiffness of vehicles having very small engine room and front overhang such as a small electric vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
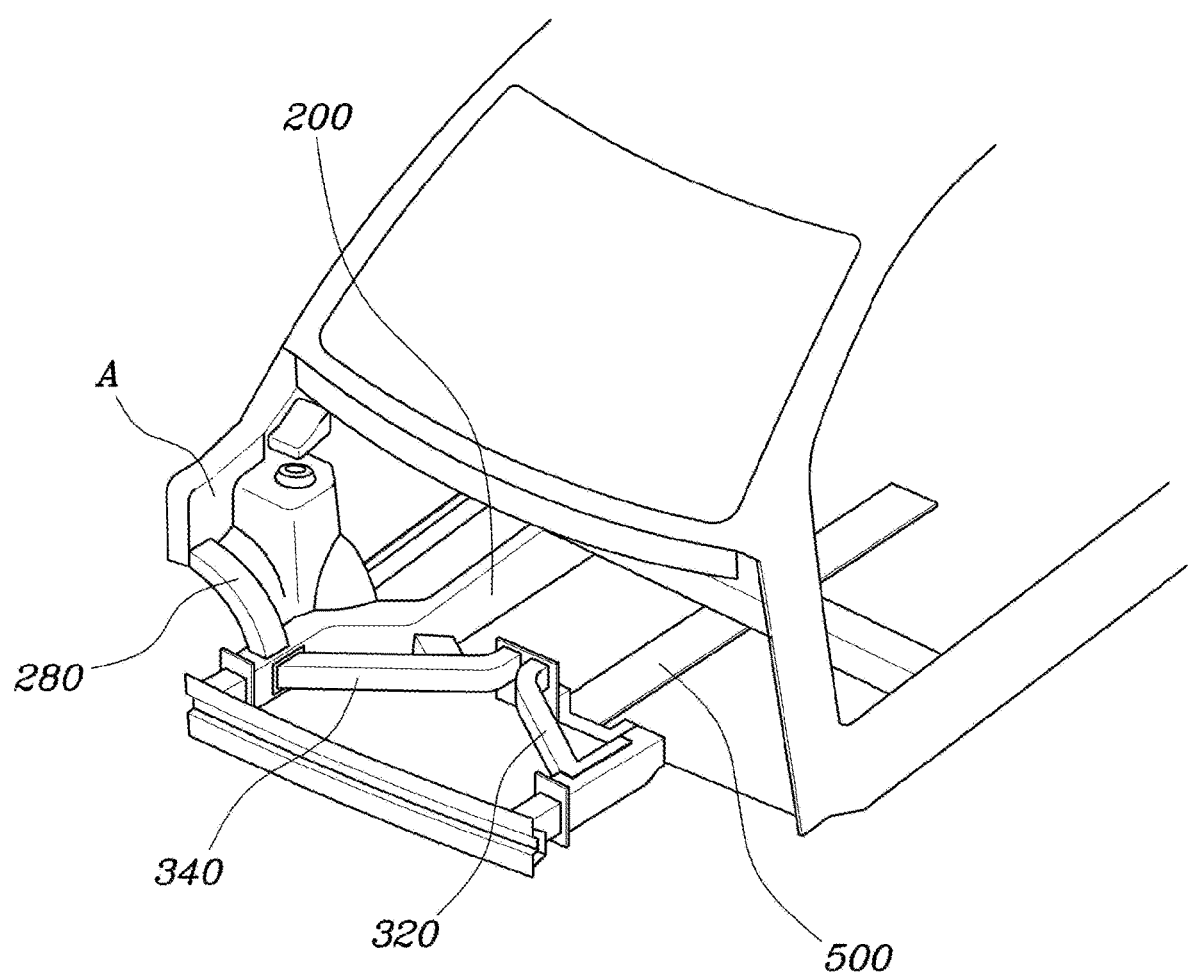
FIG. 1 is a perspective view of a front body for a vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
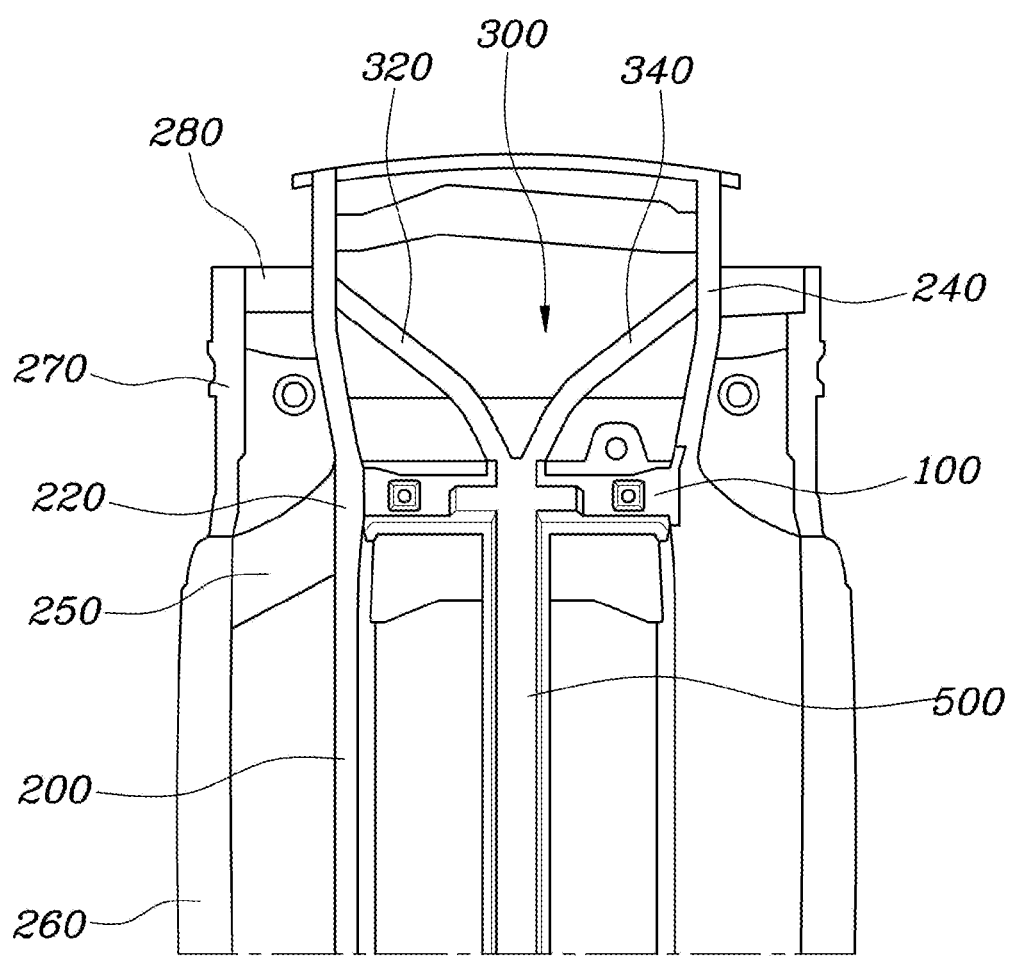
FIG. 2 is a plan view of the front body for a vehicle according to one form of the present disclosure.
Figure 3:
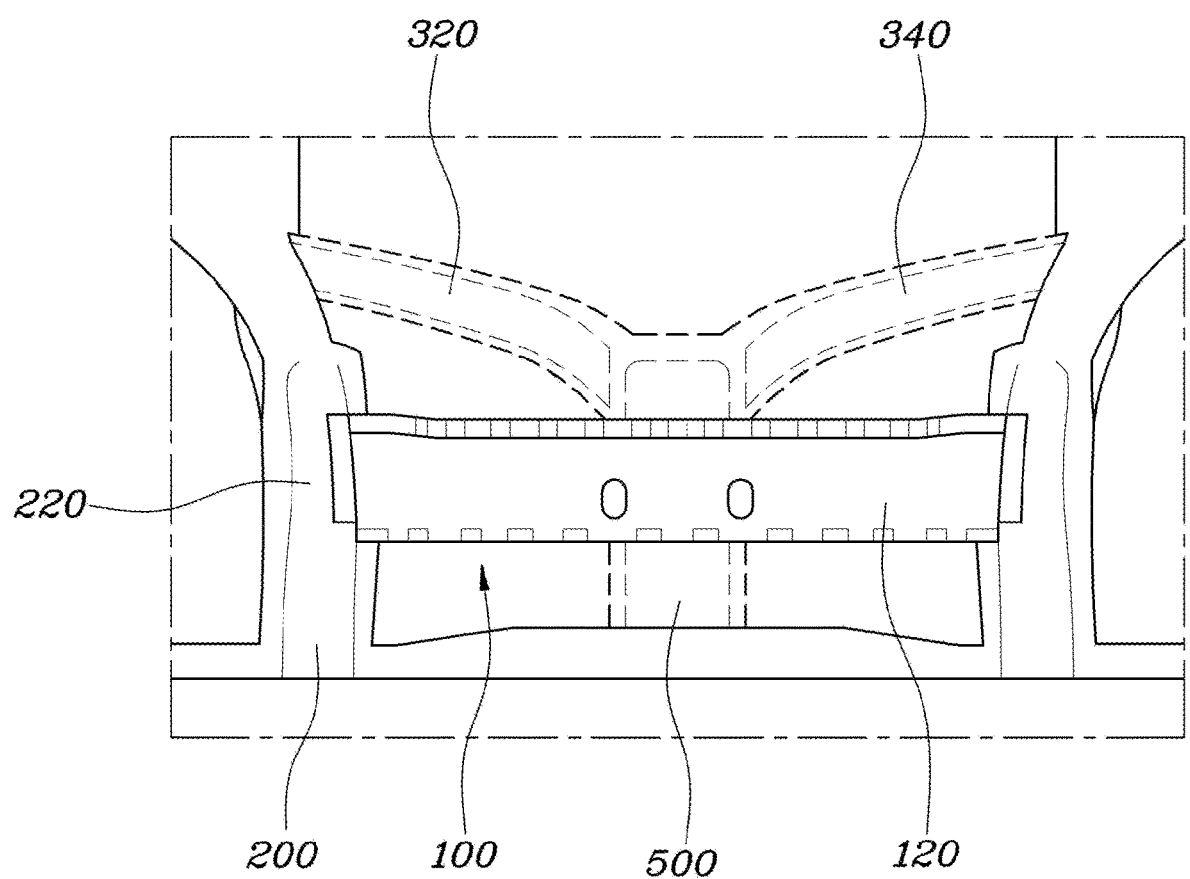
FIGS. 3 and 4 are views showing a front dash cross member of the front body for a vehicle according to one form of the present disclosure.
Figure 4:
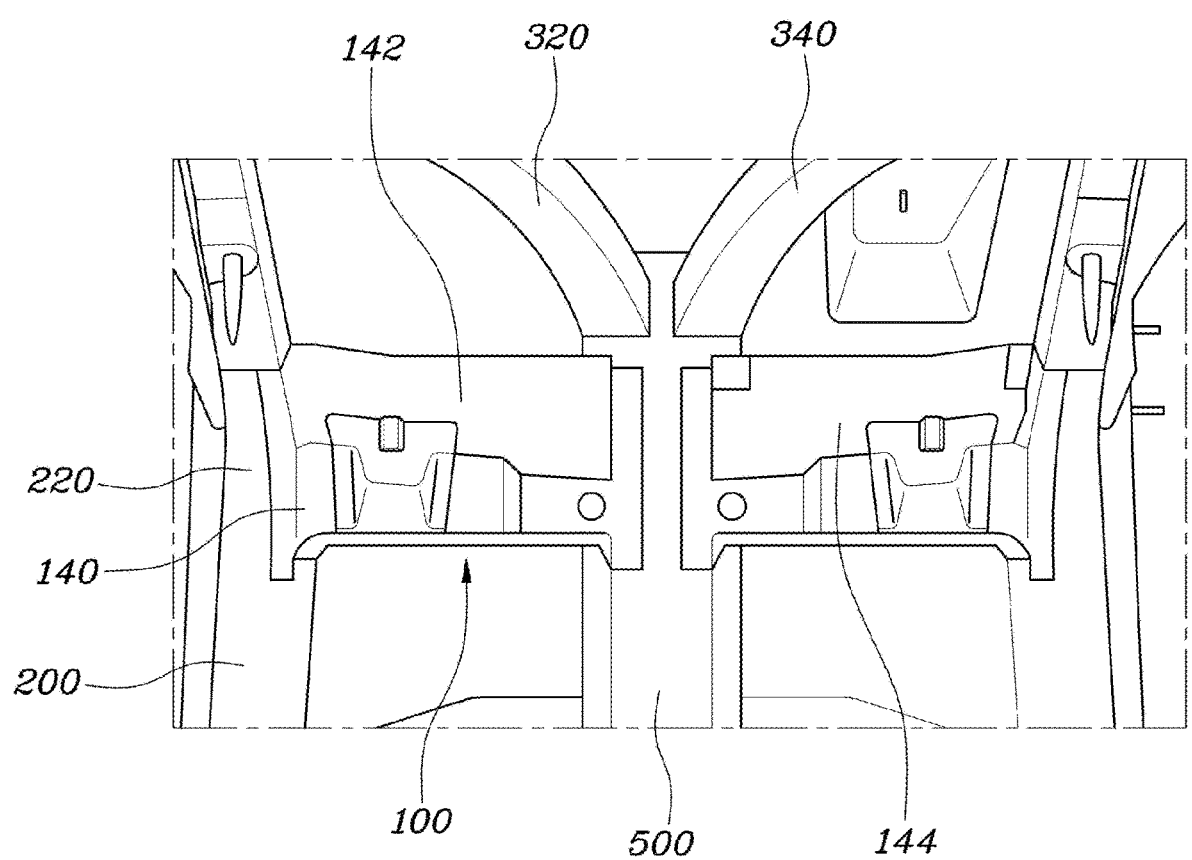

FIG. 1 is a perspective view of a front body for a vehicle according to one form of the present disclosure, FIG. 2 is a plan view of the front body for a vehicle according to another form of the present disclosure, and FIGS. 3 and 4 are views illustrating a front dash cross member of the front body for a vehicle according to one form of the present disclosure.

Referring to FIG. 1 a front body for a vehicle includes: a front dash cross member 100 having both ends respectively connected to front side members 200 positioned at both sides, and extending in a transverse direction of the vehicle; a left front center support member 320 and a right front center support member 340 being a pair of members disposed ahead of the front dash cross member 100 under an engine room of the vehicle, each having a rear end connected to a center portion of the front dash cross member 100, extending forward away from each other in both side directions, and respectively having front ends respectively connected to the front side members 200 positioned at both sides; and a center member 500 having a front end connected to the center portion of the front dash cross member 100, and extending rearward along a center line of a floor of the vehicle.

Since vehicles with a narrow engine room and a short front overhang such as a small-sized electric vehicle may have insufficient crashworthiness, the present disclosure is intended to provide a new body structure to cope with this problem.

In order to achieve this technological object, the present disclosure proposes a plan that uses the front side members 200 and a fender apron member A that are used as body structures in the related art.

First, the front dash cross member 100 of the present disclosure has both ends respectively connected to the front side members 200 positioned at both sides, and extends in the transverse direction of the vehicle. The vehicle has a floor panel and the front dash cross member 100 is positioned ahead of the floor pane, in more detail, at the lower end of a dash panel. The front dash cross member 100 extends in the transverse direction of the vehicle and has both ends respectively connected to the front side members 200 positioned at both sides.

The front dash cross member 100 includes an inner panel 120 and an outer panel 140, thereby forming a closed cross-section. Accordingly, the front dash cross member 100 forms a load path, transmits an input shock to the front side members 200 by distributing the shock to the left and right of the vehicle, and guides again the transmitted shock to propagate in the longitudinal direction of the vehicle through the front side members 200.

In detail, the front dash cross member may be configured, as shown in FIGS. 3 and 4. FIGS. 3 and 4 are views showing the front dash cross member of the front body for a vehicle according to one form of the present disclosure.

The front dash cross member 100 includes an inner panel 120 positioned inside and an outer panel 140 positioned outside with respect to the floor panel, and a closed cross-section can be formed by combining the inner panel 120 and the outer panel 140. Further, the inner panel 120 of the front dash cross member 100, as shown in FIG. 3, may have a shape covering the upper end of a center member 500 to be described below.

Further, as shown in FIG. 4, the outer panel 140 of the front dash cross member 100 includes a left panel 142 and a right panel 144, and the ends facing each other of the left panel 142 and the right panel 144 may be respectively coupled to both side ends of the center member 500.

The floor panel may be a flat panel to use the interior and the center member 500 may be coupled to the bottom of the floor panel not to spoil the aesthetic appearance of a space. Accordingly, the inner panel 120 of the front dash cross member 100, as shown in FIG. 3, is formed in a shape covering the upper end of the center member 500 to be described below, thereby making the interior floor as flat as possible. The outer panel 140 of the front dash cross member 100, as shown in FIG. 4, is composed of the left panel 142 and the right panel 144 under the floor panel. The ends facing each other of the left panel 142 and the right panel 144 may be coupled respectively to both side ends of the center member 500 protruding downward. According to this structure, it is possible to maximally use the interior and to secure a load path by using the inner and outer panels as members of the closed cross-section.

In one form of the present disclosure, the left front center support member 320 and the right front center support member 340 being a pair of members are disposed ahead of the front dash cross member 100 and located under the engine room of the vehicle. In particular, the left front center support member 320 and the right front center support member 340 each have a rear end connected to the center portion of the front dash cross member 100, extend forward away from each other in both side directions, and have front ends respectively connected to the front side members 200 positioned at both sides.

The left front center support member 320 and the right front center support member 340 transmit a shock input from the front such that the shock can be sufficiently absorbed in the longitudinal direction throughout the vehicle by transmitting the shock not only to the sides, but also the center portion of the vehicle, and function as a support for preventing the problem of deformation of the interior in a collision due to deformation of the front end of the vehicle.

In detail, the left front center support member 320 and the right front center support member 340, as shown in FIGS. 1 and 2, are formed such that the front ends extend diagonally away from each other from the rear ends, whereby they can cross the lower portion of the engine room.

Meanwhile, the front side members 200 of the vehicle may have a first connection portion 220 and a second connection portion 240 positioned forward further than the first connection portion 220. An end of the front dash cross member 100 is connected to one side of the first connection portion 220, a first connection member 250 is connected to the other side of the first connection portion 220, and the first connection member 250 may extend outward from the other side of the first connection portion and may be connected to a door chamber member 260. Accordingly, a shock input in a front collision of the vehicle propagates to both sides through the front side members 200. Further, the shock propagates to the center member 500 and the front dash cross member 100 through the front center support member 300.

Further, the shock propagating to the front dash cross member 100 keeps propagating outward in the vehicle through the first connection member 250, thereby being transmitted to the door chamber member 260.

Accordingly, a shock due to a front collision is absorbed in the longitudinal direction throughout the vehicle through the door chamber member 260, the front side members 200, and the center member 500. Further, the front of the interior is supported by the front dash cross member 100 and the first connection member 250, thereby preventing deformation of a passenger seat. Further, the front of the interior is supported again by the door chamber member 260, the front side members 200, and the center member 500, thereby securely preventing deformation of the passenger seat.

Further, the second connection portion 240 is positioned forward further than the first connection portion 220 of the front side members 200, the front end of the front center support member 300 is connected to a side of the second connection portion 240, and the second connection member 280 is connected to the other side of the second connection portion 240. Further, the second connection member 280 may extend outward in the vehicle and may be connected to the fender apron member A. Further, the second connection member 280 may extend along the front end of a front wheel housing.

According to this structure, it is possible to prevent the phenomenon that the front wheels of the vehicle deform while pushing the passenger seat inward. Further, by connecting the front side members 200, the fender apron member A, and the front center support member 300, it is possible to make the front structure of the vehicle stronger and use even the fender apron member A as a load path.

Further, this structure forms a load path by using all the members not only in a front collision, but also a side collision and an offset collision.

On the other hand, the center member has a front end connected to the center portion of the front dash cross member 100 and extends rearward at the center of the vehicle floor. Further, the rear ends of the left front center support member 320 and the right front center support member 340, as shown in FIGS. 3 and 4, are directly connected to the front end of the center member 500 and the front end of the center member 500 may be connected to the center portion of the front dash cross member 100. Accordingly, it is possible to securely support a front collision at the center of the vehicle. Further, the front dash cross member 100, the front center support member 300, and the center member 500 have a member shape having a closed cross-section and are directly and indirectly connected to each other, thereby being able to form a load path for a front collision and a side collision.

According to the front body for a vehicle of the present disclosure, it is possible to efficiently enhance crashworthiness and body stiffness of vehicles having very small engine room and front overhang such as a small electric vehicle.

Although the present disclosure was provided above in relation to specific forms shown in the drawings, it is apparent to those skilled in the art that the present disclosure may be changed and modified in various ways without departing from the scope of the present disclosure.

What is claimed is:

1. A front body for a vehicle, comprising:
   a front dash cross member having first and second ends respectively connected to front side members positioned at both sides of the vehicle, the front dash cross member configured to extend in a transverse direction of the vehicle;
   a left front center support member and a right front center support member being a pair of front center support members disposed ahead of the front dash cross member and located under an engine room of the vehicle, wherein the left and right front center support members each have a rear end connected to a center portion of the front dash cross member, extend forward away from each other, and each have a front end connected to the front side members, respectively; and
   a center member having a front end connected to the center portion of the front dash cross member, and extending rearward along a center line of a floor of the vehicle.

2. The front body of claim 1, wherein the front side members each have a first connection portion and a second connection portion positioned forward further than the first connection portion.

3. The front body of claim 2, wherein:
   an end of the front dash cross member is connected to a first side of the first connection portion,
   a first connection member is connected to a second side of the first connection portion, and
   the first connection member extends outward from the second side of the first connection portion and is connected to a door chamber member.

4. The front body of claim 2, wherein:
   at least one of the left and right front center support members has a front end connected to a first side of a corresponding second connection portion among the second connection portions of the front side members,
   a second connection member is connected to a second side of the corresponding second connection portion, and
   the second connection member extends outward from the second side of the corresponding second connection portion and is connected to a fender apron member.

5. The front body of claim 4, wherein the second connection member extends along a front end of a front wheel housing.

6. The front body of claim 1, wherein the rear ends of the left front center support member and the right front center support member are directly connected to the front end of the center member.

7. The front body of claim 1, wherein the front dash cross member, the left and right front center support members, and the center member have a closed cross-section and are directly or indirectly connected to each other, thereby forming a load path for a front collision and a side collision.

8. The front body of claim 1, wherein:
   the front dash cross member includes an inner panel positioned inside and an outer panel positioned outside, and
   the inner panel and the outer panel of the front dash cross member are configured to form a closed cross-section.

9. The front body of claim 8, wherein the inner panel of the front dash cross member is configured to cover an upper end of the center member.

10. The front body of claim 8, wherein:
    the outer panel of the front dash cross member includes a left panel and a right panel,
    the left panel and the right panel each have an end portion, and
    the end portions of the left and right panels face to each other are respectively coupled to the center member.

11. The front body of claim 1, wherein the left front center support member and the right front center support member are formed such that the front ends of the left and right front center support members extend diagonally away from each other from the rear ends thereof, thereby crossing a lower portion of the engine room.

* * * * *